(12) United States Patent
Biancone

(10) Patent No.: US 6,435,961 B1
(45) Date of Patent: Aug. 20, 2002

(54) VENTILATION SYSTEM FOR AN INTERIOR OF A MOTOR VEHICLE

(76) Inventor: Michael R. Biancone, 1696 Citadel La., Myrtle Beach, SC (US) 29577

( * ) Notice: Subject to any disclaimer, the term of this patent is extended or adjusted under 35 U.S.C. 154(b) by 0 days.

(21) Appl. No.: 09/534,263

(22) Filed: Mar. 24, 2000

(51) Int. Cl.$^7$ ................................................. B60H 1/26
(52) U.S. Cl. ...................................... 454/164; 454/909
(58) Field of Search ................................ 454/128, 130, 454/131, 140, 141, 162, 164, 909

(56) References Cited

U.S. PATENT DOCUMENTS

| | | | |
|---|---|---|---|
| 1,650,570 A | * 11/1927 | Norris | |
| 4,741,256 A | * 5/1988 | Huang | 454/141 |
| 4,800,803 A | * 1/1989 | Farmont | 454/900 X |
| 5,344,361 A | * 9/1994 | Matthias | 454/900 X |

FOREIGN PATENT DOCUMENTS

| | | | | |
|---|---|---|---|---|
| JP | 54-51141 A | * | 4/1979 | 454/900 |
| JP | 54-55933 A | * | 5/1979 | 454/141 |
| JP | 57-114108 A | * | 7/1984 | 454/141 |
| JP | 61-193920 A | * | 8/1986 | 454/900 |
| JP | 62-261520 A | * | 11/1987 | 454/141 |
| JP | 1-145222 A | * | 6/1989 | 454/900 |

* cited by examiner

Primary Examiner—Harold Joyce
(74) Attorney, Agent, or Firm—Goldstein & Lavas, P.C.

(57) ABSTRACT

A ventilation system for an interior of a motor vehicle including a fan secured to an interior surface of the roof of the motor vehicle. The fan is in communication with the electrical power source of the motor vehicle. A plurality of solar panels are secured to the motor vehicle in a spaced relationship. The solar panels are in communication with the fan. A plurality of vents are disposed within the side windows of the motor vehicle. The vents release hot air from the interior of the motor vehicle upon activation of the fan.

2 Claims, 2 Drawing Sheets

VENTILATION SYSTEM FOR AN INTERIOR OF A MOTOR VEHICLE

BACKGROUND OF THE INVENTION

The present invention relates to a ventilation system for an interior of a motor vehicle and more particularly pertains to releasing excessive heat from the interior of the motor vehicle in order to prevent heat damage thereto.

The use of ventilation devices for automobiles is known in the prior art. More specifically, ventilation devices for automobiles heretofore devised and utilized for the purpose of controlling the internal temperature of an automobile are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,167,573 to Kanno discloses a vehicle with a solar powered ventilation system, including use of an exhaust fan and side vents. U.S. Pat. No. 4,804,140 to Cantrell discloses a solar powered ventilation system, including vents and fans controlled by a thermostat. U.S. Pat. No. 4,497,240 to Nagatomo discloses a temperature control device for a vehicle, including means for temperature detection and control of a damper and a fan. U.S. Pat. No. 4,754,695 to Kovacic and U.S. Pat. No. 4,895,065 to Lamparter disclose additional ventilation devices.

While these devices fulfill their respective, particular objective and requirements, the aforementioned patents do not describe a ventilation system for an interior of a motor vehicle for releasing excessive heat from the interior of the motor vehicle in order to prevent heat damage thereto.

In this respect, the ventilation system for an interior of a motor vehicle according to the present invention substantially departs from the conventional concepts and designs of the prior art, and in doing so provides an apparatus primarily developed for the purpose of releasing excessive heat from the interior of the motor vehicle in order to prevent heat damage thereto.

Therefore, it can be appreciated that there exists a continuing need for a new and improved ventilation system for an interior of a motor vehicle which can be used for releasing excessive heat from the interior of the motor vehicle in order to prevent heat damage thereto. In this regard, the present invention substantially fulfills this need.

SUMMARY OF THE INVENTION

In the view of the foregoing disadvantages inherent in the known types of ventilation devices for automobiles now present in the prior art, the present invention provides an improved ventilation system for an interior of a motor vehicle. As such, the general purpose of the present invention, which will be described subsequently in greater detail, is to provide a new and improved ventilation system for an interior of a motor vehicle which has all the advantages of the prior art and none of the disadvantages.

To attain this, the present invention essentially comprises a fan secured to an interior surface of the roof of the motor vehicle. The fan is in communication with the electrical power source of the motor vehicle. A plurality of solar panels are secured to the motor vehicle in a spaced relationship. The solar panels are in communication with the fan. A plurality of vents are disposed within the side windows of the motor vehicle. The vents release hot air from the interior of the motor vehicle upon activation of the fan.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved ventilation system for an interior of a motor vehicle which has all the advantages of the prior art ventilation devices for automobiles and none of the disadvantages.

It is another object of the present invention to provide a new and improved ventilation system for an interior of a motor vehicle which may be easily and efficiently manufactured and marketed.

It is a further object of the present invention to provide a new and improved ventilation system for an interior of a motor vehicle which is of durable and reliable construction.

An even further object of the present invention is to provide a new and improved ventilation system for an interior of a motor vehicle which is susceptible of a low cost of manufacture with regard to both materials and labor, and which accordingly is then susceptible of low prices of sale to the consuming public, thereby making such a ventilation system for an interior of a motor vehicle economically available to the buying public.

Even still another object of the present invention is to provide a new and improved ventilation system for an interior of a motor vehicle for releasing excessive heat from the interior of the motor vehicle in order to prevent heat damage thereto.

Lastly, it is an object of the present invention to provide a new and improved ventilation system for an interior of a motor vehicle including a fan secured to an interior surface of the roof of the motor vehicle. The fan is in communication with the electrical power source of the motor vehicle. A plurality of solar panels are secured to the motor vehicle in a spaced relationship. The solar panels are in communication with the fan. A plurality of vents are disposed within the side windows of the motor vehicle. The vents release hot air from the interior of the motor vehicle upon activation of the fan.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various figures.

DESCRIPTION OF THE PREFERRED EMBODIMENT

Figure 1:
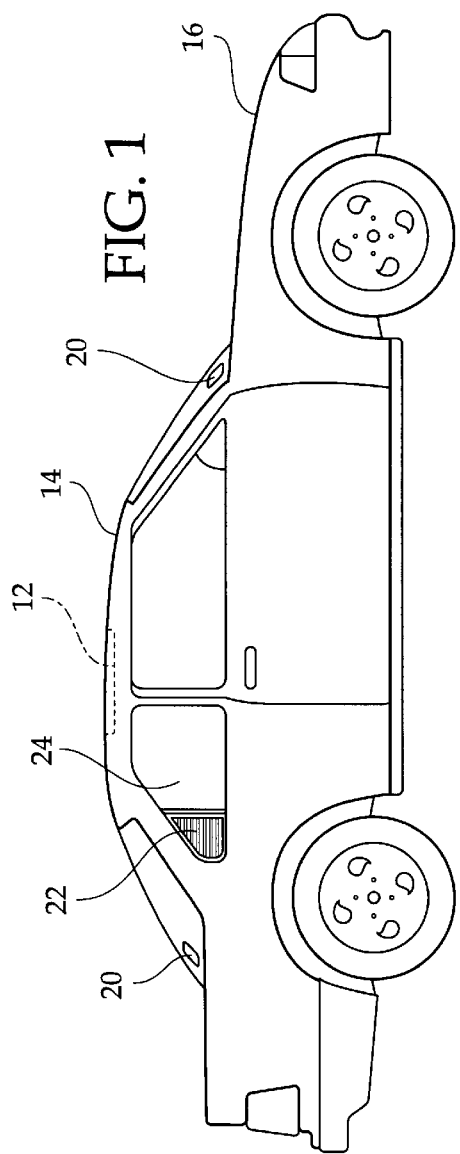
FIG. 1 is a perspective view of the preferred embodiment of the ventilation system for an interior of a motor vehicle constructed in accordance with the principles of the present invention.
Figure 2:
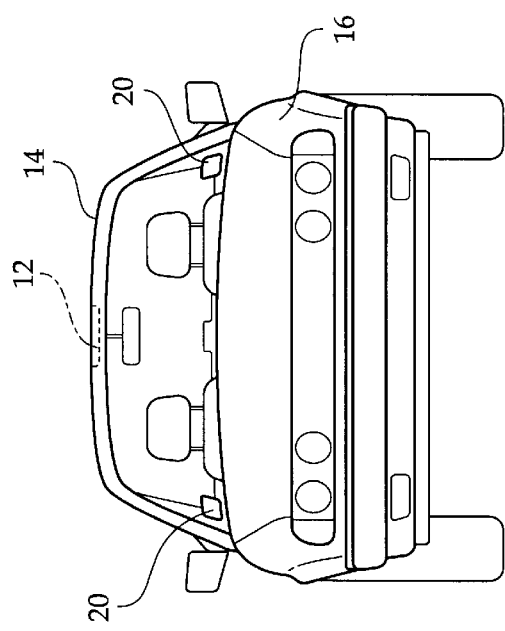
FIG. 2 is a front view of the present invention.
Figure 3:
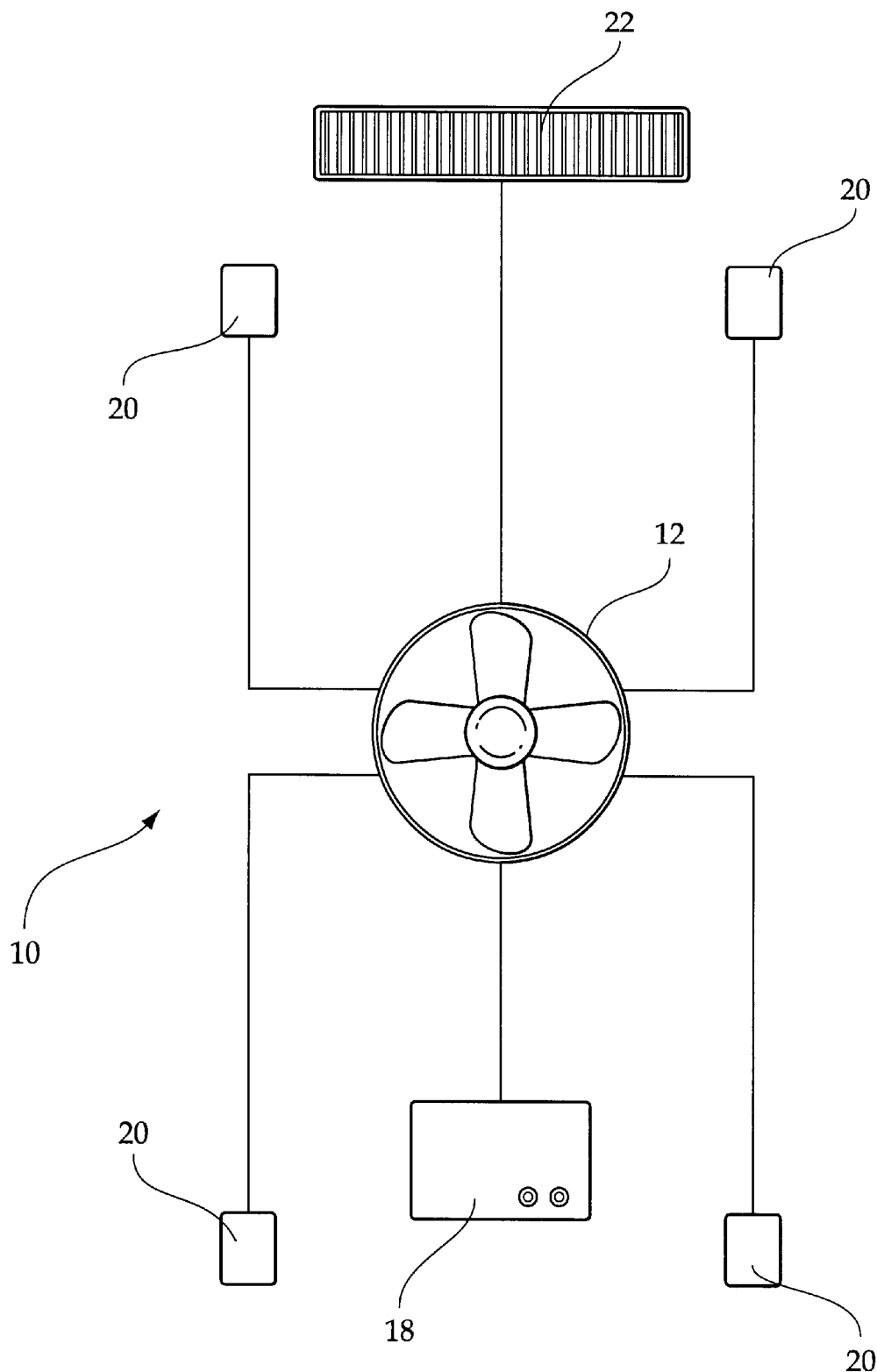
FIG. 3 is a schematic illustration of the present invention.

With reference now to the drawings, and in particular, to FIGS. 1 through 3 thereof, the preferred embodiment of the new and improved ventilation system for an interior of a motor vehicle embodying the principles and concepts of the present invention and generally designated by the reference number 10 will be described.

Specifically, it will be noted in the various FIGS. that the device relates to a ventilation system for an interior of a motor vehicle for releasing excessive heat from the interior of the motor vehicle in order to prevent heat damage thereto. In its broadest context, the device consists of a fan, a plurality of solar panels, and a plurality of vents. Such components are individually configured and correlated with respect to each other so as to attain the desired objective.

The fan 12 is secured to an interior surface of the roof 14 of the motor vehicle 16. The fan 12 is in communication with an electrical power source 18 of the motor vehicle 16. The electrical power source 18 is typically the battery for the motor vehicle. The battery can be used as either the primary or secondary power source for the fan 12.

The plurality of solar panels 20 are secured to the motor vehicle 16 in a spaced relationship. The solar panels 20 are preferably located at lower corners of the windshield and the rear window so as not to obstruct the view of the driver. The solar panels 20 are in communication with the fan 12. The solar panels 20 can be either the primary or secondary source of power for the fan 12.

The plurality of vents 22 are disposed within the side windows 24 of the motor vehicle 16. The vents 22 release hot air from the interior of the motor vehicle 16 upon activation of the fan 12.

In use, the fan 12 will be activated either through the use of a timing mechanism or a temperature sensor. Once activated, the fan 12 will serve to displace hot air, that has accumulated within the motor vehicle, through the vents 22 thereby eliminating the overbearing heat one feels when entering their vehicle on a hot day. The fan 12 can be deactivated through the same use of a timing mechanism or temperature sensor.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A ventilation system for an interior of a motor vehicle for releasing excessive heat from the interior of the motor vehicle in order to prevent heat damage thereto, the motor vehicle including a roof and side windows and an electrical power source, the ventilation system comprising, in combination:

a fan secured to an interior surface of the roof of the motor vehicle, the fan being in communication with the electrical power source of the motor vehicle;

a plurality of solar panels secured to the motor vehicle in a spaced relationship, the solar panels being in communication with the fan;

a plurality of vents disposed within the side windows of the motor vehicle, the vents releasing hot air from the interior of the motor vehicle upon activation of the fan.

2. A ventilation system for an interior of a motor vehicle for releasing excessive heat from the interior of the motor vehicle in order to prevent heat damage thereto, the motor vehicle including a roof and side windows and an electrical power source, the ventilation system comprising, in combination:

a fan secured to an interior of the motor vehicle, the fan being in communication with the electrical power source of the motor vehicle;

at least one solar panel secured to the motor vehicle in a spaced relationship, the solar panel being in communication with the fan;

at least one vent disposed within the side windows of the motor vehicle, the vent releasing hot air from the interior of the motor vehicle upon activation of the fan.

* * * * *